FIG. 1

INVENTOR.
MARVIN F. NATHAN
BY G. H. Palmer
ATTORNEY
Marilyn J. Moure
AGENT

June 1, 1965

M. F. NATHAN 3,187,066

ALKYLATION OF HYDROCARBONS

Filed June 3, 1959

INVENTOR.
MARVIN F. NATHAN

BY G. H. Palmer
ATTORNEY
Marilyn J. Maul
AGENT

FIG. 4

INVENTOR.
MARVIN F. NATHAN
BY G. H. Palmer
ATTORNEY
Marilyn J. Maue
AGENT 3,187,066
ALKYLATION OF HYDROCARBONS
Marvin F. Nathan, New York, N.Y., assignor to Pullman Incorporated, a corporation of Delaware
Filed June 3, 1959, Ser. No. 817,793
5 Claims. (Cl. 260—683.62)

This invention relates to an improved condensation process and more particularly to the alkylation of isoparaffins with olefins in the presence of an alkylation catalyst to produce hydrocarbon compounds boiling in the gasoline boiling range. In one aspect the invention relates to improving the efficiency and economy of an alkylation process and process conditions.

Among the various catalytic processes which have made possible and economical the production of fuels having a quality rating of better than 90 octane for both automotive and aviation use, the alkylation of isoparaffins has been foremost in importance. Some reasons for this are: isoparaffins as well as olefins are converted, resulting in an increased product yield; the alkylate is essentially free from gum forming materials so that additives are not required; the alkylate has a higher tetraethyl lead response than polymerized olefins and the performance in supercharged engines is superior to most other catalytically produced fuels.

Generally, the alkylation process involves contacting an isoparaffin with an olefin in the presence of a catalyst in an alkylation zone, removing the crude alkylate product and treating it either by a washing, extraction or absorbing process, to remove polymers and sulfur-bearing materials such as sulfate esters formed in the reaction zone. The treated alkylate is then deisoparaffinized in a distillation tower and the isoparaffin removed overhead is usually recycled to the reaction zone while the alkylate is removed and treated for further purification and separation.

Many chemical and engineering problems are involved in the design and operation of an efficient alkylation process. The reaction between the isoparaffin and olefin in the presence of an alkylation catalyst is exothermic and the heat of reaction must be removed during the reaction for maintenance of operating conditions. The reaction products and diluents in the feed must be removed from the hydrocarbon and catalyst phase to avoid the accumulation and interference in the isobutane-olefin reaction. Unreacted constituents must be efficiently and economically separated from the reaction effluent or alkylate for return to the reaction zone after the desired conversion is accomplished.

It has been known that the quality of alkylate products is effected by the isoparaffin concentration present in the alkylation zone during the reaction. However, a large part of the isoparaffin available for use in the alkylation reaction is supplied from the deisoparaffinization of alkylate in the distillation zone after leaving the reactor and the quantity available for recycle in prior art operations, has been limited by the size of the distillation tower. Deisoparaffinization of prior processes represents a major cost from the standpoint of both investment of utilities and alkylation units, therefore, the amount of isoparaffin recycle in conventional systems is limited by economic considerations. Furthermore, in such conventional or prior art systems, much expensive and intricate heat exchange equipment is employed between the alkylation zone and the distillation tower to attain the temperatures and pressures at which deisoparaffinization is accomplished; for example, a typical tower bottom temperature is about 200° F. while the pressure is about 110 p.s.i.g. These temperatures and pressures are far in excess of those required for the alkylation reaction, which is usually carried out at a temperature below 80° F. under about 50 p.s.i.g. These extreme temperature and pressure differences between the two adjacent zones contributes to the operational expense and detracts from the efficiency of the present day processes.

In addition to these difficulties, tremendous quantities of alkylation effluent require intricate and costly equipment for the removal of acid and acid esters which are formed along with the alkylate product in the alkylation zone and which degrade the alkylate. To accommodate the large volume of alkylation effluent for the removal of sulfur-bearing materials, it has been necessary to provide oversized washing equipment to accomplish the desired result. The necessity of removing these contaminants prior to distillation is dictated by the fact that the esters decompose at the temperatures and pressures at which deisoparaffinization is accomplished and their presence in the distillation zone results in clogging the reboiler and trays of the deisoparaffinizer. For this reason, much expense is added to the overall cost of the operation.

It is, therefore, an object of this invention to provide an improved process for the alkylation of hydrocarbons in the presence of an alkylation catalyst.

It is another object of this invention to reduce the volume of material for treatment in the removal of sulfur-bearing materials.

It is another object of this invention to reduce the number of treating steps to which alkylate is subjected for concentration and refinement.

Still another object of this invention is to increase thermodynamic efficiency in an alkylation process.

It is another object of this invention to provide a more efficient and economical method of deisoparaffinizing alkylate.

Still another object of this invention is to increase the ratio of isoparaffin to olefin in the reaction zone.

Still another object of this invention is to decrease the volume of inerts in the alkylation feed.

Other objects and advantages of the present invention will become apparent to those skilled in the art from the following description and disclosure.

According to the preferred process of this invention, an isoparaffin is contacted with an olefin in the presence of a catalyst in an alkylation contactor or reactor to produce a vaporous effluent containing low boiling hydrocarbons, for example, paraffins, and a liquid effluent containing catalyst, alkylate and unreacted feed material. The catalyst is separated from the hydrocarbon liquid effluent and at least a portion of the hydrocarbon liquid is passed to a distillation zone where it is deisoparaffinized. The vaporous effluent, which is formed by the evaporation of reactant and lower boiling hydrocarbons in the exothermic alkylation reaction and which thus provides temperature control in the present process, is removed as auto-refrigerant from the alkylation zone, compressed and passed in indirect heat exchange with the liquid hydrocarbons in the deisoparaffinization zone to provide heat thereto and to maintain distillation conditions therein. The compressed vapor or auto-refrigerant, which comprises the heat exchange medium serving to reboil the liquid hydrocarbons undergoing deisoparaffinization, is at least partially condensed and the condensed portion recycled to the alkylation zone at a temperature and pressure suitable for the alkylation reaction. A vaporous overhead fraction of isoparaffin from the distillation zone is removed, compressed, condensed and also returned to the alkylation zone under suitable temperature and pressure conditions.

One of the preferred embodiments of the present invention involves operating the distillation tower as a stripper, that is, without any reflux to the tower, or with a relatively small amount of reflux. Another preferred embodiment is realized by subjecting deisoparaffinized alkylate to treatment for the removal of sulfur-bearing materials such as sulfate esters, which are formed together with alkylate in the reaction zone, although it is also within the scope of this invention to carry out this neutralization treatment immediately following the alkylation reaction and prior to deisoparaffinization. The alkylate product which is substantially free of sulfur compounds is then treated for further concentration and purification, for example, by subjecting the alkylate to deparaffinization and fractional separation, if desired.

The process of the present invention is applicable to all alkylation processes involving the reaction between an isoparaffin and an olefin in the presence of a catalyst. The isoparaffins which may be used include isobutane, isopentane, isohexane, etc., or mixtures thereof and the olefins reacted with these isoparaffins include propylenes, butylenes, pentylenes, and isomers and mixtures thereof. It is within the scope of this invention to utilize any proportion of the above as feed stocks and, in addition, mixtures of isoparaffins and olefins in the presence or absence of n-paraffins.

A wide variety of catalysts are available for use in the alkylation of an isoparaffin (an alkylatable hydrocarbon) with an olefin. Among the catalysts included within the scope of this invention are mineral acids such as sulfuric acid, hydrofluoric acid, phosphoric acid, chlorosulfonic acid, fluorosulfonic acid, etc., which may be used either singly or in mixtures. Non-solid Friedel-Crafts catalysts which form a liquid phase substantially immiscible with the hydrocarbon phase may also be used. These include the conventional Friedel-Crafts metallic halides, such as aluminum chloride, in acid such as those just enumerated and metallic halide-hydrocarbon complexes. Other liquid catalysts which provide a heterogeneous reaction mixture with the hydrocarbon may also be employed within the scope of this invention.

It is also to be understood that other types of condensation reactions, wherein a vaporous reactor effluent is produced, which is capable of supplying heat to a distillation zone by reboiling the liquid in the zone, are also within the scope of this invention. A particular example of such a condensation reaction involves the alkylation of an aromatic compound such as benzene with an olefin such as propene.

The most preferred reaction of the present invention involves the reaction between isobutane and an olefin in the presence of a sulfuric acid or hydrofluoric acid catalyst.

Generally, the alkylation reactions take place over a wide range of temperature and pressure, ranging from about −50° F. to about 500° F. and from about 0 p.s.i.g. to about 1000 p.s.i.g. However, the preferred reaction of the present invention is preferably carried out at a temperature of between about 25° F. and about 100° F. and a pressure of from about 5 p.s.i.g. to about 50 p.s.i.g. However, the alkylation of an aromatic compound with an olefin is usually carried out at a temperature of from about 200° F. to about 500° F. To establish favorable conditions for the production of high octane alkylate in high yields, it is desirable to contact the reactants with vigorous agitation so as to provide uniform mixture of the reactants and, to maintain at the point of contact, a high concentration of alkylatable hydrocarbon as compared to olefin. This can be accomplished by introducing olefinic hydrocarbons into an emulsified stream of alkylatable hydrocarbons and acid which is moving past the point of olefin introduction at a high or maximum velocity within the reaction zone. The major portion of the isoparaffin present in the reactor is preferably provided by a recycle stream obtained from a subsequent distillation step namely, the deisoparaffinization step, and from the refrigerant stream as hereinafter described; although, a major portion of isoparaffin may be continuously supplied from an outside source, if desired. Normally, a portion of the isoparaffin is introduced into the contactor with the olefin reactant and a second portion is emulsified with the catalyst prior to contact with olefin. However, it is also within the scope of this invention to introduce the entire isoparaffin charge with the catalyst.

In the operation of the present invention, the ratio of isoparaffin to acid is generally between about 2:1 and about 15:1 and the ratio of isoparaffin to olefin feed in a reaction zone falls within the range of from about 2 mols to about 150 mols of isoparaffin per mol of olefin. Prior art processes have shown that mol ratios of about 10:1 or less isoparaffin to olefin are commonly used; however, by the process of the present invention, as hereinafter described, mol ratios in the region of up to 200:1 are obtainable and beneficial in the production of high quality alkylate. It has been found that the formation of undesirable reaction products (esters) in the reaction zone is inversely proportional to the molar excess of isoparaffin while the formation of higher quality alkylate is directly proportional to the molar excess of isoparaffin. Therefore, mol ratios of between about 20:1 and about 150:1 isoparaffin to olefin are preferred. The higher mol ratios of this range are obtained when operating the deisoparaffinization zone as a stripper.

Although the present alkylation process is adaptable to any of the numerous types of contacting apparatus employed for alkylation and may be carried out in one or more stages, the preferred apparatus and method which is particularly suited to the present process, is the cascade type reactor wherein the alkylatable hydrocarbon and acid are emulsified in each of several confined reaction zones in several stages in series and the olefin is separately introduced and is uniformly dispersed throughout the emulsion in each reaction zone. The reaction mixture passes serially through the plurality of reaction zones within the reaction section of the contactor wherein the temperature is maintained at a constant low level by vaporizing the lighter components of the reaction mixture including some of the isoparaffin reactant. The reaction mixture then enters a separation section wherein liquid and vapor phases are separated. In the separation section, the liquid catalyst, preferably an inorganic acid such as sulfuric acid, is also removed from the liquid hydrocarbon phase and a portion of the acid separated is generally recycled to the reaction section, usually after being fortified with fresh acid so as to maintain the catalyst in a highly concentrated state, for example, preferably above about 85 percent sulfuric acid.

In the process of the present invention at least a portion of the liquid hydrocarbon phase which contains a mixture of isoparaffin, alkylate, acid esters and which may or may not contain normal butane and residual acid catalyst, can be treated to remove traces of catalyst and ester contaminants, or can be passed to a deisoparaffinization zone wherein the isoparaffin is distilled from the alkylate mixture at a temperature between about 50° F. and about 260° F. under from about 0 p.s.i.g. to 100 p.s.i.g., preferably at a tower bottoms temperature between about 50° F. and about 200° F. under a tower top pressure from about 0 p.s.i.g. to about 60 p.s.i.g. The deisoparaffinized alkylate can then be subjected to subsequent refinement steps such as, the removal of acid esters by water-washing, bauxite treating, caustic washing or combinations of these or other known treating steps, deparaffinization and fractionation into light and heavy alkylate.

The vaporous hydrocarbons removed from the contactor as auto-refrigerant are compressed and passed in indirect heat exchange with the liquid material in the deisoparaffinization zone whereupon the zone is reboiled and the auto-refrigerant is at least partially condensed, the condensed portion being recycled to the contactor as part of the isoparaffin feed thereto.

The above treatment or refinement of the decatalyzed liquid hydrocarbon effluent can be accomplished by various methods some of which are novel in the alkylation art. For example, according to the present invention, the total liquid hydrocarbon effluent can be treated for ester removal and then passed directly to a deparaffinization zone wherein normal paraffin and isoparaffin are simultaneously removed from the alkylate by distillation. It may be that under certain conditions of low contaminant concentration, it is desirable to first remove normal and isoparaffins and follow the deparaffinization of the alkylate by treatment for the removal of esters according to one of the methods mentioned above. Nevertheless, according to the present invention, the removal of these impurities is more often carried out prior to removal of normal paraffin because of the high temperature required to free the alkylate of normal paraffin. At such a temperature the ester impurities decompose so that if substantial amounts of sulfur compounds are present, they will cause fouling in the distillation tower. However, when a catalyst other than sulfuric acid is employed in the alkylation reaction, the liquid effluent may be free of these contaminants. During the deparaffinization in a first distillation zone, the resulting overhead mixture of normal paraffin and isoparaffin is withdrawn, and passed to a deisoparaffinization zone wherein isoparaffin is separated as an overhead vapor from liquid normal paraffin in a second distillation zone.

Another method for treating the decatalyzed liquid hydrocarbon effluent involves passing the effluent to a fractionation zone wherein isoparaffin is removed as a vaporous overhead fraction, normal paraffin is removed as a vaporous side fraction and deparaffinized alkylate is removed as a liquid bottoms fraction as a product of the process. This product can be further fractionated into light and heavy product fractions if so desired.

When operating in this manner, however, temperatures attained in the lower portion of the fractionation zone are sufficient to cause decomposition of sulfur-bearing contaminants which are usually present in the liquid hydrocarbon effluent when sulfuric acid is employed as the catalyst of the alkylation reaction. To avoid clogging in the fractionation zone, the total liquid downflow in the fractionation zone is removed as a continuous stream of liquid hydrocarbon at a point between the normal paraffin take-off and the bottom of the tower, treated for removal of contaminants and recycled to the fractionation zone, or the liquid effluent is neutralized prior to fractionation.

The vaporous normal paraffin stream is condensed and collected as a product of the process and the vaporous isoparaffin fraction is subsequently condensed and recycled to the alkylation zone as a part of the feed thereto.

The most preferred embodiment for treating the liquid hydrocarbon effluent in accordance with the present invention comprises passing the entire decatalyzed liquid hydrocarbon stream directly from the contactor to the deisoparaffinization zone, deisoparaffinizing the crude alkylate stream by distillation at about atmospheric pressure or a little above in a tower which is reboiled by indirect heat exchange with compressed, vaporous auto-refrigerant, and the isoparaffin fraction thus produced, withdrawing the resulting deisoparaffinized alkylate from the first distillation zone, washing or otherwise treating the crude alkylate for removal of impurities such as esters and acid, when they are present, then passing the deisoparaffinized alkylate stream to a second distillation zone wherein normal paraffin is separated from alkylate and withdrawing the liquid from the second distillation zone as the alkylate product of the process or passing the liquid to a third distillation zone wherein the alkylate is separated into light and heavy fractions.

The first of the embodiments discussed above reduces the number of treating steps to which alkylate is subjected and since all non-alkylate material is substantially removed from the alkylate product in one step, a smaller volume of material is treated in the deisoparaffinization zone and a more economical method of separating recycle isoparaffin is realized.

The second embodiment, not only calls for the removal of substantially all non-alkylate material from the liquid product, but also provides for the immediate and continuous separation of the various components present in the non-alkylate vapor fraction. Thus, the second embodiment provides an additional economy in the operation of the above invention.

The third of the embodiments discussed above which involves the treatment of crude alkylate for removal of sulfur-containing impurities after the deisoparaffinization step, represents an advance over methods of the prior art, in that the washing or neutralization equipment, aside from being considerably reduced in size, operates to more efficiently remove the sulfur compounds from the liquid phase containing alkylate wherein they are concentrated. A further advantage is that caustic cannot be recycled to the contactor and result in the consumption of acid. If such a procedure were followed in any of the alkylation processes known heretofore, the presence of sulfur compounds in the deisoparaffinization zone would cause severe fouling in the first distillation tower due to the temperatures at which the tower is operated. It is only by the conditions of the present invention, discussed above, and the process which provides means for operating under these conditions that the efficiency and economy of the present modified alkylation process is realized.

Although both of the novel methods of treating the liquid hydrocarbon stream discussed above find application in the present invention, it is to be understood that the conventional arrangement of process steps, namely alkylation, treatment for the removal of sulfur compounds followed by deisoparaffinization and the deparaffinization, is also within the scope of the present invention and also provides an advancement in the art in the thermodynamic efficiency of the present process.

The auto-refrigerant or vaporous hydrocarbon phase removed from the alkylation contactor, is treated to remove any liquid entrained therewith such as, for example, liquid catalyst and the separated liquid is returned to the liquid hydrocarbon phase in the contactor while the vaporous material, which contains some of the isoparaffin reactant and lower boiling hydrocarbons, is passed to a compressor and compressed to a pressure at which the condensation temperature will be sufficient to reboil the deisoparaffinization tower and the vapors will be at least partially condensed by indirect heat exchange, i.e., all of the sensible heat down to the vaporization temperature and at least some of the heat of vaporization will be removed during the reboiling operation. In the case of the alkylation of isoparaffin with butylene, the auto-refrigerant vapors are compressed, to between about 20 p.s.i.g. to about 125 p.s.i.g. at a condensation temperature of between about 40° F. and about 140° F. and preferably when isobutane is the alkylatable hydrocarbon to between about 30 p.s.i.g. and about 115 p.s.i.g. at a temperature of between about 55° F. and about 130° F.

The compressed gas is removed from the compressor and is passed in indirect heat exchange with the material in the deisoparaffinization zone, for example, by means of an external reboiler to supply heat and maintain distillation conditions in the deisoparaffinization zone. One or more of such heat sources can be employed, if desired, by one or more vaporous streams leaving the compressor. In the practice of this invention, it has been found that part of the reboiling heat can be introduced above the bottom of the tower and that the higher the reboiler is placed on the deisoparaffinization tower, the lower the compression of vapor required for reboiling the tower. Therefore, if a plurality of reboilers are employed to supply heat to the deisoparaffinization zone, the gaseous material employed as heat exchange media may be compressed as separate streams to various pressures, or it can be compressed as one stream and drawn off at various pressure levels, in accordance with the requirement of the reboiler with which they exchange heat. It has also been discovered that a reboiler which is in indirect heat exchange with compressed gaseous material can be used in combination with another reboiler employing steam as a heat source or any other high temperature source of heat. For example, at least one reboiler in indirect heat exchange with compressed gaseous material may be located at approximately the middle of the tower while an additional reboiler in indirect heat exchange with steam, supplied from an outside source, may assist in supplying heat to the bottom of the tower. It should be understood, however, that the assistance of a steam reboiler is not required to maintain distillation conditions in the deisoparaffinization tower and can be eliminated from the process of the present invention, if desired.

As the compressed gaseous material passes through the indirect heat exchanger, it is at least partially condensed by the cooling effect of the material in the reboiler. The condensed portion of the partially condensed material may be directly recycled to the contractor at a suitable temperature and pressure for the alkylation reaction or partially condensed material may be further cooled to condense an additional amount of vapors and the resulting condensed portion returned to the contactor. It is preferable to further cool the compressed material leaving the heat exchanger until at least a major portion, most preferably the entire portion, is present as liquid and then to flash the liquid thus produced to vaporize materials boiling below the isoparaffin reactant and return the liquid isoparaffin portion to the contactor at a suitable temperature and pressure. In this way, the lower boiling hydrocarbons are readily removed from the system as vapor and the vapor can be fractionated for separate recovery of the materials contained therein or otherwise treated in accordance with the requirements of the individual process. Thus, the isoparaffin returning to the contactor is in a purified, more concentrated state, and the deleterious effects of non-reactant materials in the feed, such as high circulation rates, high compression requirements, etc., is reduced to a minimum.

The deisoparaffinization tower can be operated at a lower, higher or the same pressure as that employed in the alkylation zone. The vaporous isoparaffin fraction is removed from the top of the deisoparafinization tower and the isoparaffin is passed to the compressor where these vapors become part of the heat exchange media and are mixed and compressed with the auto-refrigerant. In the alkylation of isobutane with butylene, the isoparaffin fraction, at a pressure between about 0 p.s.i.g. and about 60 p.s.i.g. and between about 20° F. to about 100° F., is compressed to between about 30 p.s.i.g. and about 115 p.s.i.g. and to a condensation temperature between about 40° F. and about 130° F. The compressed isoparaffin vapor may be condensed and recycled to the contactor by means of cooling or cooling and flashing or it may be employed as a heat exchange medium to provide heat and maintain distillation conditions in the deisoparaffinization zone in a separate reboiler. Preferably, the isoparaffin vapor is passed to the same reboiler as that to which the compressed auto-refrigerant from the contactor is passed since it is usually combined with auto-refrigerant in the compressor. When used as a heat exchange medium and after supplying heat to the distillation tower, either separately or in admixture with the compressed auto-refrigerant, the compressed isoparaffin overhead fraction, is cooled or cooled and flashed as hereinabove described and the resulting liquid portion recycled under suitable conditions to the contactor as a part of the feed thereto.

The above method of supplying heat required to distill isoparaffin in the deisoparaffinization tower by means of compressed auto-refrigerant and the vaporous isoparaffin fraction provides for the commercially feasible operation of the deisoparaffinization tower at about atmospheric pressure and at correspondingly low temperatures.

In commercial processes of the prior art, it has been necessary to operate the deisobutanization zone at bottom temperatures and tower top pressures in excess of 165° F. and 100 p.s.i.g., which operation presents great heat exchange requirements for which numerous expensive heat exchange units are provided between the contactor and the deisoparaffinization tower. In addition to these difficulties, the processes of prior art have found it mandatory to perform the removal of sulfur compounds from the entire liquid phase leaving the contactor in a tedious and inefficient manner, prior to the deisoparaffinization step where these compounds encounter conditions which cause their decomposition. The gum forming tendencies of sulfur compounds has been the source of much expense attributed to shutting down and cleaning out the lines and trays of the deisoparaffinization tower and other subsequent distillation towers and, therefore, the utmost care has been exercised to remove small traces of these contaminants. By the process of the present invention, these difficulties have been eliminated or reduced to a minimum by: (1) providing a thermodynamically more efficient alkylation process, (2) making it possible to operate the deisoparaffinization zone at conditions approximating those employed in the alkylation zone thereby avoiding decomposition of sulfur compounds in this zone and (3) providing an operation which can safely postpone the treatment of crude alkylate until after a large volume of the liquid has been removed as isoparaffin, thereby reducing the size of the equipment employed in the contaminant removal step.

When the deisoparaffinization tower is operated as a stripper in the process of the present invention, the amount of isoparaffin separated and available for recycle to the contactor is greatly increased, so that mol ratios of isoparaffin to olefin in the contactor may be increased from between about 2:1 and about 10:1 to between about 10:1 and about 200:1. Since the higher isoparaffin ratio in the contactor results in higher yields of better quality alkylate, and since the operation of the deisoparaffinzer tower as a stripper, or under conditions approaching a stripper, requires a smaller unit as compared with a reflux tower, the deisoparaffin stripper (or a tower with low reflux) is preferred, although deisoparaffinzation towers having a high reflux can be employed in the operation of the present invention, if desired. Furthermore, the operation of the deisobutanization tower at lower pressure increases the relative volatility between isoparaffin and normal paraffin and, consequently, less heat and fewer theoretical trays are required to achieve separation.

For a better understanding of the present invention, reference is now had to the accompanying drawings of which

Figure 1:
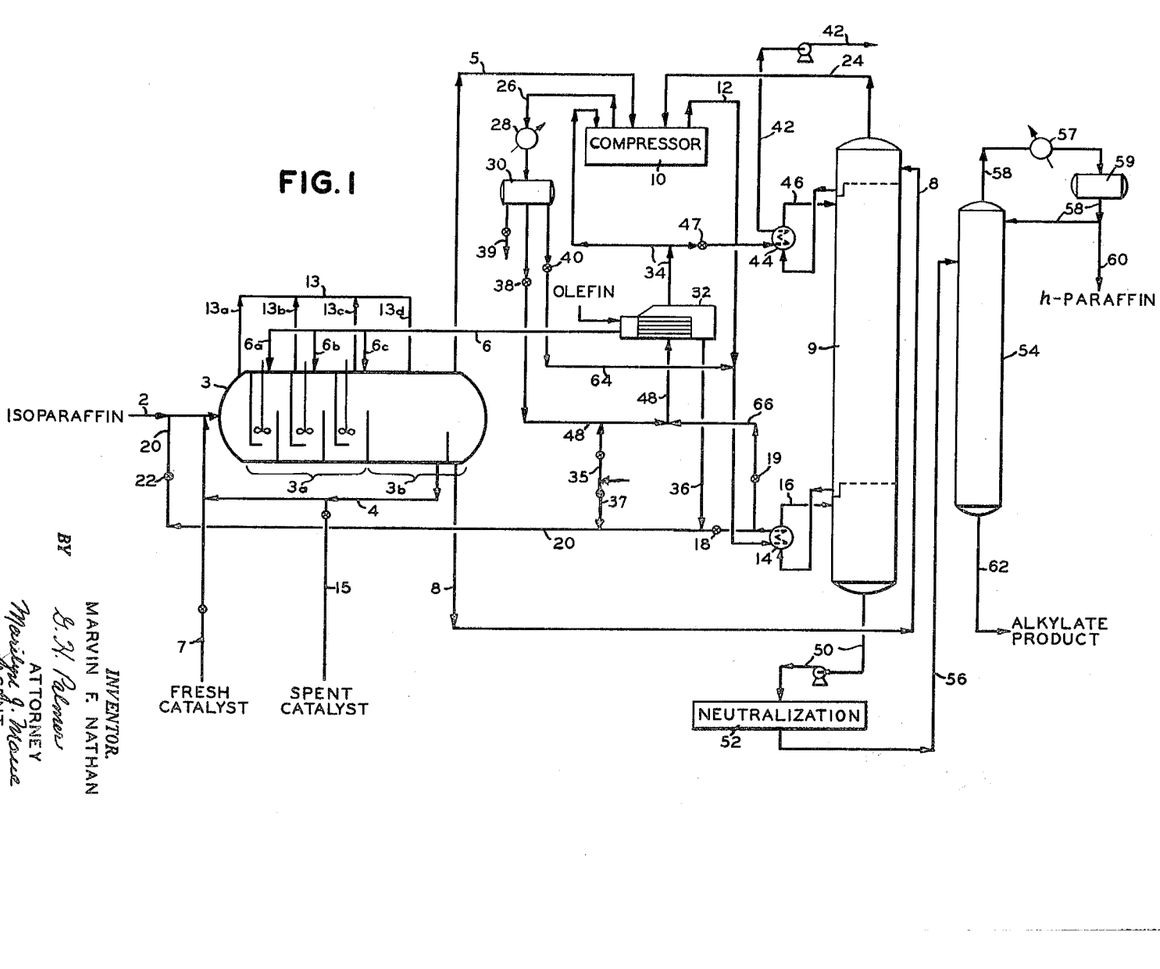
FIGURE 1 is a diagrammatic illustration of an alkylation process wherein a preferred embodiment of the present invention is described.

Referring to FIGURE 1 wherein a first embodiment exemplifying the invention in an alkylation process is shown, isoparaffin or the alkylatable hydrocarbon, is fed into contactor 3 from line 2 and is contacted with olefin entering contactor 3 from lines 6, 6(a), 6(b) and 6(c). The reaction is carried out under conditions hereinbefore described in the presence of catalyst, for example, sulfuric acid of at least 85 percent concentration, entering the contactor from line 7. Generally, the alkylatable hydrocarbon and the liquid catalyst are emulsified prior to contact with olefin thus increasing the rate of reaction and reducing the formation of undesirable by-products to a minimum. The isoparaffin emulsion and olefin are reacted in the reaction section 3(a) of the contactor, preferably by passing emulsion serially through a plurality of reaction zones with separate introduction of olefin into each zone. During the reaction, a portion of the reaction mixture is vaporized in each reaction zone and the vapors or auto-refrigerant is separately removed from each zone through lines 13 through 13(c) and returned to the contactor through line 13(d) to provide cooling and, therefore, temperature control to the reaction section of the contactor. The resulting product mixture including the vapors returned through line 13(d), is then passed to a separation section 3(b) wherein a vaporous phase containing unreacted isoparaffin and lower boiling hydrocarbons is separated from a liquid phase containing alkylate product, catalyst, lower boiling hydrocarbons and reaction by-products such as, for example, sulfate esters. Also in separation section 3(b), the liquid catalyst is separated from the product mixture, withdrawn from the conductor by line 4 and a portion is recycled to the reaction section of the contactor through line 7 wherein it is mixed with fresh acid. The remaining portion of used acid is withdrawn from the process in valved line 15 and may be regenerated for further use in the process. The liquid product mixture is removed from the contactor through line 8 and pumped to a deisoparaffinization tower 9, usually containing between about 10 and about 80 distillation trays. If desired, a coalescer (not shown) can be inserted into line 8 to further separate the acid catalyst, and esters from the liquid product mixture, before introducing the mixture into tower 9.

The vaporous hydrocarbon phase or auto-refrigerant is removed from the separation section of the contactor through line 5 and is passed to a compressor 10 wherein the vapors are compressed to a pressure between about 20 p.s.i.g. and about 125 p.s.i.g., for example 50 p.s.i.g. and a condensation temperature between about 40° F. and about 140° F., for example 75° F. Generally, a coalescer (not shown) is employed at the top of the contactor or in line 5 for separating liquid material entrained in the vapors and returning the liquid material to the liquid phase in separating section 3(b). Part of the compressed gases are then passed through line 12 into reboiler 14 in indirect heat exchange with reboiler 14 for the deisoparaffinization tower 9 to supply heat thereto and to maintain distillation conditions in the tower.

Isoparaffin is removed from the liquid product mixture through line 24 from the top of deisoparaffinization tower 9 as a vaporous overhead fraction and is passed to compressor 10 wherein it is compressed to a pressure of between about 20 p.s.i.g. and about 125 p.s.i.g., for example, 50 p.s.i.g. at a condensation temperature of between about 40° F. and about 140° F., for example 75° F.

Another compressed vaporous stream under between about 20 p.s.i.g. and about 125 p.s.i.g. at a condensation temperature of between about 40° F. and about 140° F. is removed from the compressor through line 26 and passed to cooler 28 wherein the vapors are condensed.

In a first embodiment of this process, valves 18 and 38 are in open position, valves 19, 40 and 47 are closed and the compressor vapor material, which has been cooled to a liquid by the indirect heat exchange operation in heat exchanger 14, is recycled to the reaction section of the contactor through lines 20 and 2, after passing through pressure reduction valve 22 wherein the pressure and the liquid is adjusted to the pressure employed in the alkylation reaction section 3(a). The condensed vapor from cooler 28 is then transferred to holding drum 30, from which a portion of the liquid is withdrawn by valved line 48 and passed to flashing zone 32. The remaining portion of the liquid in holding drum 30, is passed through valved line 39 to a distillation zone (not shown) wherein hydrocarbons boiling below the isoparaffin reactant are withdrawn from the system as vapors and the resulting concentrated isoparaffin liquid is returned to the system in line 48 by means of valved line 35. The liquid material in zone 32 is flashed in indirect heat exchange with olefin entering the system through line 6 and the resulting vaporous materials are withdrawn from flashing zone 32 by means of line 34 and recycled to compressor 10, while the resulting liquid portion is withdrawn from flashing zone 32 by line 36 and recycled to contactor 3 through lines 20 and 2 after passing through pressure reduction valve 22.

The deisoparaffinized liquid product mixture is removed from the bottom of deisoparaffinization tower 9 through line 50 and passed to a neutralization zone 52 wherein the liquid product is washed with caustic solution followed by a water-wash at an elevated temperature, for example, at about 140° F. to remove traces of acid and sulfate esters from the product mixture prior to treatment at temperatures which cause decomposition of these impurities. The neutralized liquid product is then passed to deparaffinization tower 54 through line 56 wherein normal paraffin is distilled from the alkylate product at a bottoms temperature of between about 200° F. and about 360° F. under between about 40 p.s.i.g. and about 90 p.s.i.g. The gaseous normal paraffin is withdrawn from the deparaffinization zone, passed to cooler 57 to condense the vapor, passed to surge drum 59 and recycled to the top of the deparaffinization tower as reflux thereto by means of line 58. A portion of the refluxing liquid normal paraffin is withdrawn from the process, through line 60 while the liquid alkylate product is withdrawn from the bottom of deparaffinization tower 54 through line 62. If desired, the alkylate product can be further fractionated to separate light and heavy alkylate fractions in a rerun tower (not shown).

In a second embodiment of the invention shown in FIGURE 1, valves 38, 47 and 19 are in closed position and valves 18, 39 and 40 are opened. The process is substantially the same as that described above in the first embodiment, except that concentrated isoparaffin is returned to the system by line 37 instead of line 35, and the liquid material in holding drum 30 is passed through valve 40 and line 64 and is joined with compressed gaseous material in line 12 as heat exchange media for heat exchanger 14 in indirect heat exchange with the liquid entering reboiler line 16. The cooled liquid material emerging from heat exchanger 14 is then passed by means of line 12, valve 18 and line 20 to pressure reduction valve 22 to adjust the pressure of the recycle isoparaffin to correspond with conditions in the alkylation reaction zone and the recycle stream is thereafter introduced into contactor 3, together with fresh isoparaffin from line 2 as part of the isoparaffin feed thereto. The subsequent treatment of the deisoparaffinized liquid product mixture from tower 9 is substantially the same as described above.

In a third embodiment of the invention illustrated in FIGURE 1, valves 18, 39 and 40 are in closed position and valves 38, 19 and 47 are opened. Here, as above, the process follows the description of the first embodiment, except that the total liquid material in holding drum 30 is passed through valve 38 and line 48 into flashing zone 32 wherein it is flashed by indirect heat exchange with olefin entering the system through line 6. The resulting liquid isoparaffin is passed to line 20 by line 36 from which, after proper pressure adjustment, it is recycled to the reaction section of contactor 3. The resulting vapors are passed through line 34 and a portion of this material is recycled to compressor 10 through line 34 while the remaining portion is passed through line 42 to heat exchanger 44 in indirect heat exchange with the liquid product mixture in reboiler line 46 of the deisoparaffinization zone. Thus, the alkylate product mixture or trap-out liquid in reboiler line 46 is heated and distillation conditions are maintained in the top of the deisoparaffinization tower. By the process of indirect heat exchange, the vapors are cooled to a liquid and are pumped to a distillation zone (not shown) through line 42 wherein hydrocarbons boiling below the isoparaffin reactant are removed from the system and concentrated liquid isoparaffin reactant is returned to the process by means of valved line 35 which joins liquid material passing to the flashing zone in line 48.

The compressed vapor from compressor 10 is passed through line 12 into heat exchanger 14 in indirect heat exchange with the liquid alkylate product mixture in reboiler line 16 as described in the first embodiment. However, the material emerging from heat exchanger 14 in line 12, which has been cooled to a liquid, is passed into line 66 by means of valve 19 and this material enters flashing zone 32 by means of line 48. After flashing, the liquid portion is recycled to contactor 3 by means of lines 36, 20 and valve 22, as previously described.

Figure 2:
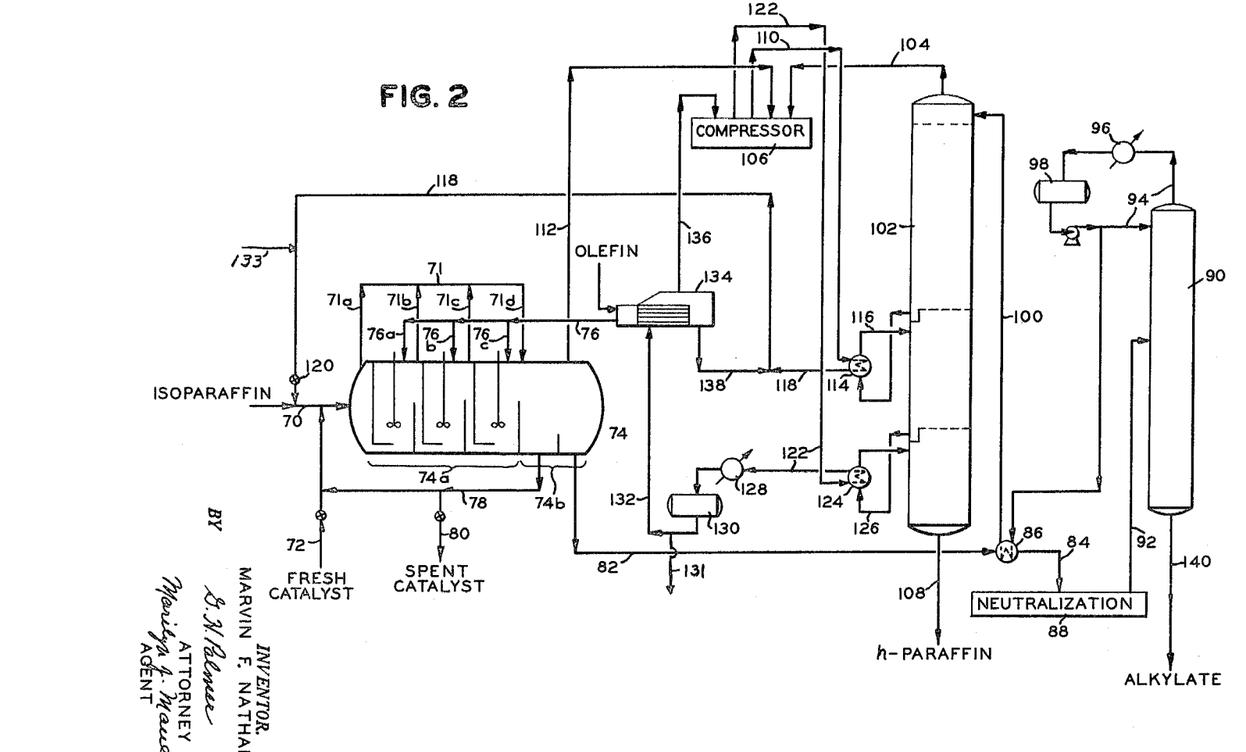
FIGURES 2, 3 and 4 are additional embodiments of alkylation processes wherein applicant's invention is employed.

FIGURE 2 of the drawings illustrates an embodiment of an alkylation process wherein the liquid alkylate product mixture is passed directly from the contactor to a neutralization zone and then to a deparaffinization zone wherein isoparaffin and normal paraffin are removed as vapors from the liquid alkylate product by distillation. According to this procedure, an emulsion of isoparaffin from line 70 and liquid acid catalyst from line 72 is formed in the reaction section 74(a) of contactor 74. The paraffin in the emulsion is contacted with olefin entering reaction section 74(a) through lines 76, 76(a), 76(b) and 76(c) in each of a plurality of reaction zones. Although any number of reaction zones can be employed, from 2 to 8 reaction zones are usually provided in the reaction section of the contactor. Actually it has been found that contactors containing from 3 to 7 reaction zones are most preferred. The reaction of isoparaffin with olefin takes place in the reaction section 74(a) of contactor 74 at a temperature of between about 25° F. and about 100° F. under between about 5 p.s.i.g. and about 50 p.s.i.g. After the reaction has taken place, the entire product mixture is passed to a separating section 74(b) of contactor 74 wherein vaporous effluent or auto-refrigerant is continuously separated from liquid product mixture containing acid catalyst, alkylate, unreacted isoparaffin, lower boiling hydrocarbons and small amounts of sulfate ester impurities. The vaporous effluent is then withdrawn from the contactor in line 112 and compressed in compressor 106. The acid catalyst is continuously separated from the liquid hydrocarbon phase, preferably by settling in the separating section 74(b) and the separated acid is recycled to the reaction section of the contactor through lines 78 and 72 wherein it is fortified with fresh acid from line 72 to maintain a high acid concentration. A portion of the used acid in line 78 can be withdrawn for regeneration through valved line 80. The liquid product mixture is removed from the contactor by line 82 and is pumped into heat exchanger 86 in indirect heat exchange with paraffins separated from the alkylate as hereinafter described. After being heated in heat exchanger 86, the liquid hydrocarbon product mixture is passed through line 84 and into a neutralization zone 88 wherein it is contacted with bauxite for the removal of traces of acid catalyst and sulfate esters; although, caustic washing and/or water-washing may be substituted for the bauxite treatment if so desired. The neutralized product mixture is removed from neutralization zone 88 and is passed to deparaffinization zone 90 by means of line 92 wherein the isoparaffin, normal paraffin and lower boiling hydrocarbons are removed as vapors by distilling the mixture at a bottoms temperature of between about 200° F. and about 360° F. under between about 40 p.s.i.g. and about 100 p.s.i.g.

The liquid alkylate product is withdrawn from deparaffinization zone 90 through line 140. The vaporous overhead fraction is passed through line 94, condensed in cooler 96 and pumped to holding drum 98. A portion of the material removed from holding drum 98 is returned as reflux to deparaffinization tower 90 by line 94 and the remaining portion is passed through line 100 into heat exchanger 86 in indirect heat exchange with the liquid product mixture from contactor 74. As a result of the heat exchange step, the hydrocarbon mixture in line 100 is further cooled and is then passed to deisoparaffinization tower 102 wherein isoparaffin and lower boiling hydrocarbons are removed as an overhead vapor in line 104, from liquid normal paraffin by distillation, at a temperature between about 20° F. and about 100° F. under from about 15 p.s.i.g. to about 55 p.s.i.g. The vaporous isoparaffin overhead in line 104 is then passed to compressor 106 wherein it is mixed with the vaporous reactor effluent and the vapors are compressed to two pressure levels, between about 20 p.s.i.g. and about 125 p.s.i.g. at a condensation temperature between about 40° F. and about 140° F. The normal paraffin is withdrawn from the system as a liquid bottoms fraction from deisoparaffinization tower 102 through line 108. The distillation conditions in deisoparaffinization tower 102 are maintained by indirect heat exchange of the material in the deisoparaffinization zone with compressed gaseous auto-refrigerant as hereinafter described.

The vapor or auto-refrigerant from contactor 74 is withdrawn through line 112 and passed to compressor 106 wherein it is compressed to two pressure levels, between about 20 p.s.i.g. and about 125 p.s.i.g., at a condensation temperature of between about 40° F. and about 140° F. For example, one portion of the vaporous material in the compressor is pressured to 90 p.s.i.g. while the other portion is compressed to 55 p.s.i.g. A portion of the compressed gases in compressor 106, for example, that portion which is under 55 p.s.i.g., is removed through line 110 and passed to heat exchanger 114, in indirect heat exchange with the hydrocarbon material in reboiler line 116 from the deisoparaffinization zone to supply heat to said material and maintain distillation conditions within tower 102. The compressed gaseous material or isoparaffin reactant, being cooled to a liquid by passing through indirect heat exchanger 114, is then sent to pressure reduction valve 120 by means of line 118 whereupon the pressure is adjusted to that employed in the reaction section of the contactor, i.e., between about 5 p.s.i.g. to about 50 p.s.i.g. and the liquid is recycled as part of the isobutane feed to contactor 74 by lines 118 and 70.

The remaining portion of compressed vapors in compressor 106, for example, that which is compressed to the higher pressure is passed through line 122 to heat exchanger 124 in indirect heat exchange with the liquid hydrocarbon material in reboiler line 126 of the deisoparaffinization zone to supply heat thereto and to maintain distillation conditions in deisoparaffinization tower 102. The compressed material leaving the heat exchanger in line 122 is then passed to a cooler 128 wherein substantially all of the vapors not condensed in heat exchanger 124, are liquified. The resulting condensed material is then accumulated in holding drum 130 and a portion passed to flashing zone 134 by means of line 132 while the remaining portion is withdrawn in line 131 for treatment in the removal of low boiling hydrocarbons. In flashing zone 134 the liquid material from holding drum 130 is flashed and, by means of indirect heat exchange with olefins entering the system through line 76, cools said olefins. The vapors which result from the flashing and heat exchange operation are removed through line 136 and recycled to compressor 106, where they are compressed to pressures heretofore described. The remaining liquid portion is removed from the flashing zone through line 138 and passed to line 118 and then to pressure reduction valve 122 in order to adjust the pressure of the recycle liquid to the requirements of the alkylation reaction zone; the liquid being recycled thereafter through lines 118 and 70 to contactor 74, together with isoparaffin in line 133 from the treatment for removal of low boiling hydrocarbons, as part of the isoparaffin feed thereto.

Figure 3:
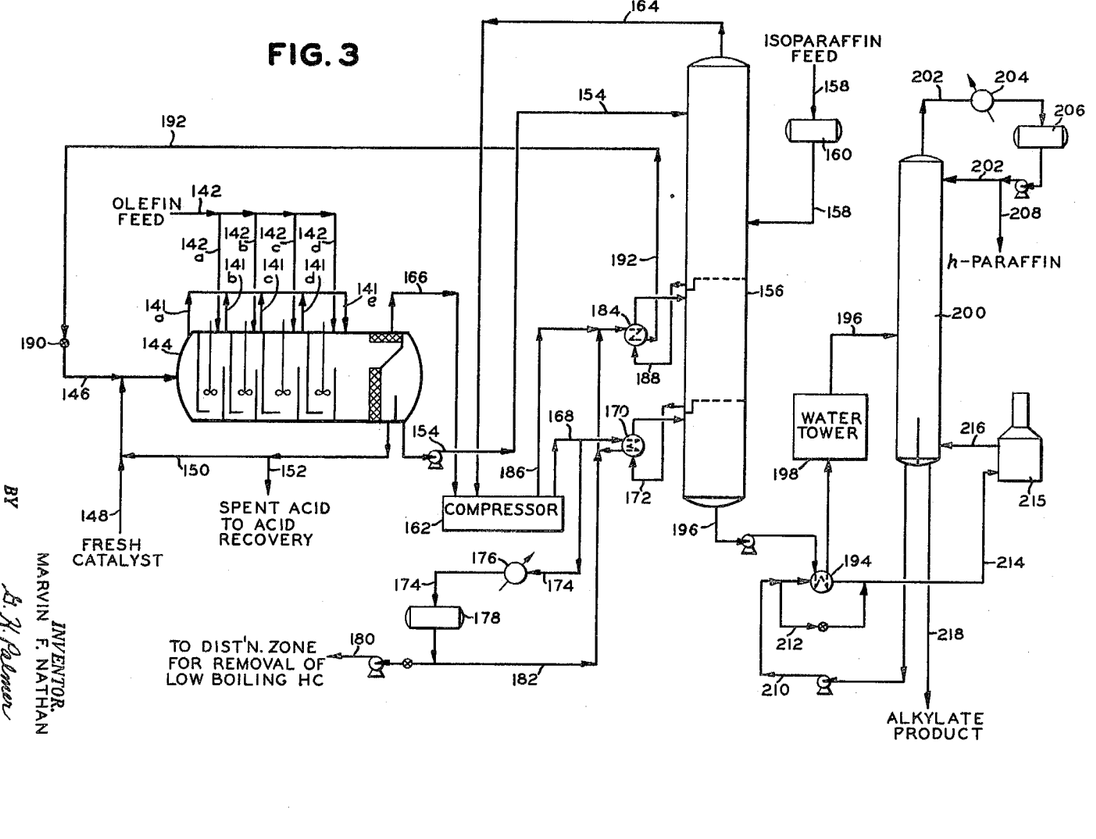

FIGURE 3 illustrates still another embodiment of the present invention when employed in an alkylation process. According to this process, an isoparaffin-acid catalyst emulsion is reacted with olefin from lines 142–142(d) in reaction section 144(a) of a cascade alkylation reactor 144. The isoparaffin enters the reaction section from line 146 from a source hereinafter described, while acid is introduced through line 148 and emulsified with isoparaffin prior to contact with olefin. The reaction takes place upon contact of olefin with the emulsion at a temperature of between about 25° F. and about 100° F. under from about 5 p.s.i.g. to about 50 p.s.i.g. After the reaction is completed, the product mixture is transferred to a separating section 144(b) within reactor 144 wherein a vaporous effluent or auto-refrigerant containing isoparaffin and lower boiling hydrocarbons, is separated from a liquid phase containing alkylate, acid catalyst, isoparaffin, normal paraffin and contaminants. Vaporization of the lower boiling components in each reaction zone during the alkylation reaction is effected as a temperature control and the total of these vaporized components comprise the auto-refrigerant removed from the liquid product mixture and thence from the reactor in line 166.

The liquid phase is separated, preferably by settling, into an acid catalyst phase and a liquid product mixture or hydrocarbon phase containing in addition to hydrocarbons, contaminants, such as, for example, sulfate ester by-products of the reaction and traces of acid catalyst. The acid phase is withdrawn from the reactor by line 150 and a portion recycled through line 148 wherein it is fortified with fresh acid to maintain a high acid concentration, preferably between about 85 percent to about 99 percent acid. A portion of the used acid is withdrawn from the system through valved line 152 and may be regenerated if desired.

The liquid product mixture is withdrawn from reactor 144 and transferred to deisoparaffinization tower 156 by means of line 154. Fresh isoparaffin required for the alkylation reaction to provide a mol ratio of between about 2:1 and about 150:1 isoparaffin:olefin in the reaction zones is introduced into deisoparaffinization tower 156 by line 158 from holding drum 160. The liquid product mixture is stripped of isoparaffin reactant and lower boiling hydrocarbons in tower 156 at a bottom temperature of between about 50° F. and about 200° F. under tower top pressure from about 0 p.s.i.g. to about 60 p.s.i.g.

The isoparaffin and lower boiling hydrocarbons are removed from tower 156 as a vaporous overhead fraction and are passed by line 164 to compressor 162 wherein they are compressed to two pressure levels ranging from pressures between about 20 p.s.i.g. and about 125 p.s.i.g. at condensation temperatures between about 40° F. and about 140° F.

The vaporous auto-refrigerant is transferred by line 166 from reactor 144 to compressor 162 wherein the auto-refrigerant is compressed to two pressure levels ranging from pressures between about 20 p.s.i.g. and about 125 p.s.i.g. at condensation temperatures from about 40° F. to about 140° F.

When the vapors passed to compressor 162 are compressed to different pressures and in accordance with the teaching of the invention the most highly compressed vapor is used to supply heat to a lower portion of the deisoparaffinization tower than the vapor compressed to a lower pressure. Therefore, vapors compressed to between about 20 p.s.i.g. and about 50 p.s.i.g. are removed from the compressor by line 186 and passed to heat exchanger 184 while the vapors compressed to between about 40 p.s.i.g. and about 125 p.s.i.g. are removed from the compressor by line 168 and used in heat exchanger 170. A portion of the vapors in line 168 is passed to heat exchanger 170 in indirect heat exchange with the liquid product mixture in reboiler line 172 of tower 156. The remaining portion of compressed vapors is passed to by-pass line 174 into cooler 176, wherein substantially all of the vapor is condensed, and then into holding drum 178 from whence a portion of the liquid material is removed from the system through line 180 for further treatment in the removal of paraffins boiling below the isoparaffin reactant (not shown). The remaining portion of liquid from holding drum 178 is passed to line 182 and joins condensed heat exchange medium leaving heat exchanger 170 in line 168. The condensed liquid, predominately isoparaffin reactant, is passed upwardly through line 182 to the compressed, vaporous heat exchange medium entering a more elevated heat exchanger 184 from line 186 into indirect heat exchange with the liquid product mixture in reboiler line 188 of the deisoparaffinization zone. This gaseous-liquid mixture supplies heat to the liquid product mixture and maintains distillation temperature in the deisoparaffinization tower. The gas of the heat exchange medium is condensed by the heat exchange operation and resulting liquid is transferred to a pressure reduction valve 190 by line 192 prior to entry into isoparaffin recycle line 146. By means of valve 190 the pressure of the liquid isoparaffin is adjusted to a pressure suitable for alkylation.

The deisoparaffinized product mixture in tower 156 is removed as a liquid by line 196 and is pumped to heat exchanger 194 in indirect heat exchange with a reboiler line hereinafter described. The product mixture which is heated in heat exchanger 194 is then passed to a neutralization zone 198 wherein it is washed with water at an elevated temperature between about 100° F. and about 150° F., and is then passed through a coalescer (not shown) to separate and remove the water before the product mixture is passed through line 196 into deparaffinization tower 200. Normal paraffin is separated from the alkylate product by distillation at a temperature between about 200° F. and about 360° F. under between about 40 p.s.i.g. and about 100 p.s.i.g. in tower 200. The normal paraffin which is removed as an overhead vapor in line 202 is cooled to a liquid in condenser 204, passed to accumulator 206 and a portion returned to the top of tower 200 by line 202. The remaining portion of normal paraffin leaving accumulator 206 is pumped out of the system in line 208.

Reboiler liquid is withdrawn from the bottom of tower 200 by line 210, pumped to heat exchanger 194 to supply heat to the product mixture entering the water wash 198 or pumped to valved heater by-pass line 212 which is provided for temperature control. The reboiler liquid from line 212 is combined with reboiler liquid from heater 194 in line 214 and the combined liquid is then passed from line 214 into heater 215 wherein the reboiler liquid is heated and partially vaporized at a temperature necessary to maintain the distillation temperature in tower 200 and then returned to tower 200 by line 216.

The liquid alkylate product in tower 200 is withdrawn as a product of the process by line 218 or further separated into light and heavy alkylate by passing it from line 218 into an alkylate rerun tower or distillation zone (not shown) wherein light alkylate for example, aviation gasoline, is withdrawn from the top of the tower and heavy alkylate is withdrawn from the bottom of the rerun tower.

Figure 4:
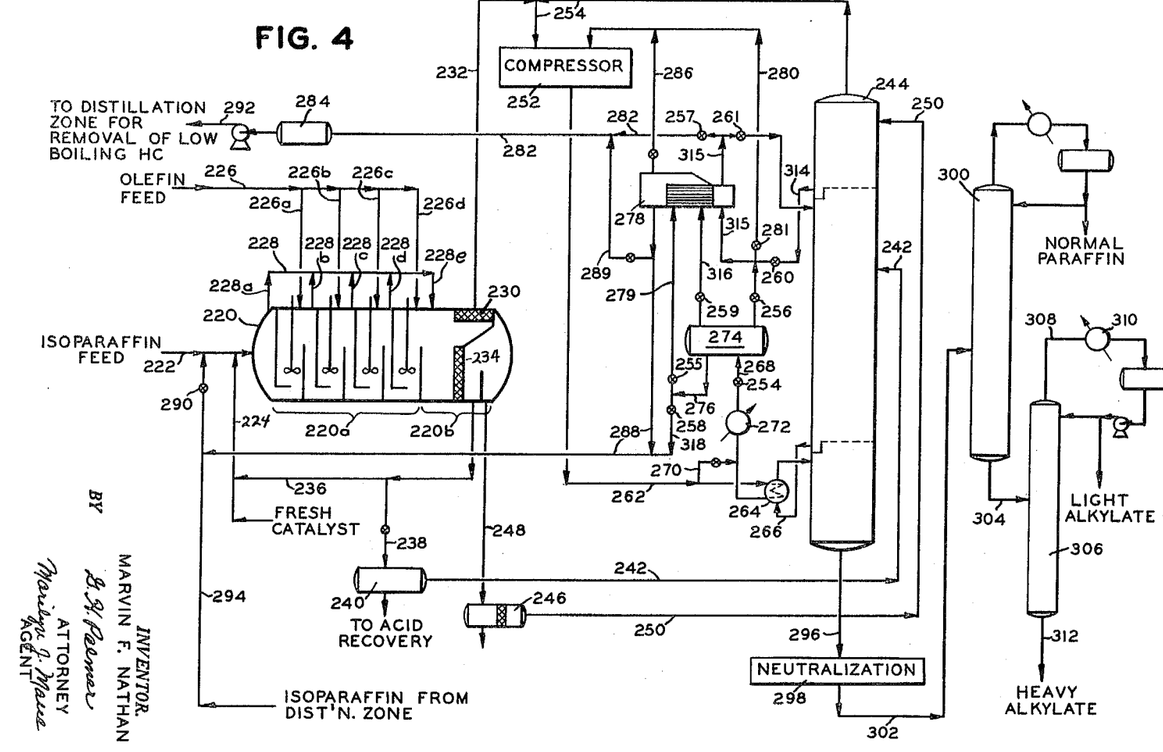

FIGURE 4 illustrates another modification of the present invention wherein the alkylation reaction in contactor 220 is substantially as described above in any of the preceding figures. Isoparaffin enters the contactor from line 222 and is emulsified with acid catalyst entering the contactor from line 224. The emulsion is then reacted with olefin which is separately introduced into each of a plurality of reaction zones through lines 226, 226(a), 226(b), 226(c) and 226(d) in the reaction section 220(a) of contactor 220. After passing the emulsion serially through each of the reaction zones, removing the reaction vapors from each zone through lines 228, 228(a), 228(b), 228(c) and 228(d) and returning the vapors to the contactor through line 228(e), the entire reaction mixture is passed to the separation section 220(b) of contactor 220 wherein the vapors are passed through coalescer 230 to separate liquid entrained therewith, the vapors being passed to line 232 while the separated liquid is returned to the liquid phase entering the separation section. The combined liquid is passed through coalescer 234 to break the acid catalyst-liquid hydrocarbon emulsion. The liquid is then allowed to settle and acid catalyst is separated from the liquid hydrocarbon product mixture. Recycle line 236 is provided for removing the acid catalyst from the separation section, pumping it to line 224 wherein it is mixed with a sufficient amount of fresh acid to maintain the concentration at between about 85 percent and 99 percent $H_2SO_4$. The concentrated acid is then returned to the contactor for emulsification with isoparaffin. A portion of the spent acid is withdrawn from line 236 through valved line 238, passed to an additional settler 240 in order to recover and remove in line 242 any of the liquid product mixture entrained therewith. The spent acid is then sent to an acid recovery system (not shown) for concentration while the separated liquid product mixture in line 242 is passed to deisoparaffinization tower 244.

The liquid alkylate product mixture separated in the contactor is pumped through line 248 into coalescer 246 to further separate acid catalyst. The liquid product mixture is then withdrawn from coalescer 246 and pumped through line 250 into deisoparaffinization tower 244. In tower 244, vaporous isoparaffin and lower boiling hydrocarbons are stripped from the liquid product mixture at a tower top temperature of between about 20° F. and about 100° F., under from about 0 p.s.i.g. to about 60 p.s.i.g. The vapors are removed overhead in line 254 and passed to a compressor 252 wherein they are compressed to a pressure of between about 25 p.s.i.g. and about 125 p.s.i.g. at a condensation temperature from about 50° F. to about 140° F.

The vaporous effluent or auto-refrigerant removed from the contactor in line 232 is passed to compressor 252 wherein they are compressed to a pressure and temperature within the above-mentioned range.

Herein the process departs from the previously described embodiments. Valves 254 through 257 and 281 are opened and valves 258 through 261 are closed. A stream of compressed gas is withdrawn from compressor 252 in line 262 and a portion, necessary to maintain the temperature of distillation in tower 244, is passed to heat exchanger 264 in indirect heat exchange with the trap-out liquid in reboiler line 266 to supply the necessary heat thereto. In the heat exchange operation, the compressed gas is partially condensed and the partially condensed material is passed through line 268 wherein it is joined by the remaining portion of compressed gas which by-passes the heat exchanger in valved line 270. The entire compressed gaseous-liquid heat exchange media is then passed to condenser 272 wherein the entire mixture is cooled to a liquid. The resulting liquid is transferred to a first flashing zone 274 from which a liquid portion is removed through line 276 and passed to heat exchanger 278 through valved line 279. A portion of the gas is removed from the first flashing zone 274 and passed to heat exchanger 278 through valved lines 280 and 315 for indirect heat exchange with the liquid portion previously mentioned from zone 274 and the remaining portion of gas in line 280, controlled by valve 281, is passed on through line 280 for return to compressor 252, wherein it is pressured to between about 20 p.s.i.g. and about 125 p.s.i.g.

The gas entering heat exchanger 278 is condensed and transferred to holding drum 284 by line 282 while the liquid entering heat exchanger 278 from line 279 is flashed and partially vaporized; the vaporized portion being passed through valved line 286 which joins line 280 for recycle to the compressor by way of line 280. The remaining liquid portion in heat exchanger 278 is withdrawn by line 288 and split into two portions, one of which is passed to pressure reduction valve 290 and recycled to the reaction section of contactor 220 as part of the isoparaffin feed thereto through line 222 and the second of which is withdrawn from line 288 by valved line 289 and passed to holding drum 284.

The combined liquid in holding drum 284 has a higher concentration of low boiling materials than either the auto-refrigerant stream or the deisoparaffinization tower overhead by reason of the flashing and separating operation in zone 274. The materials boiling below the isoparaffin reactant are removed from the system by passing the combined liquid from holding drum 284 to a distillation zone (not shown) by means of line 292. In this distillation zone, the lower boiling materials are removed from the system as a vaporous overhead fraction while the isoparaffin reactant, which is removed as a liquid bottoms fraction is returned to the reactor by line 294. The advantage attained by this arrangement is that smaller volumes of liquid are distilled for a given volume of lower boiling materials removed from the system. Therefore, a smaller more efficient distillation zone can be employed in this embodiment of the present process.

The total portion of liquid in drum 284 is withdrawn by line 292 and is pumped to a distillation zone (not shown) for removal of hydrocarbons boiling below the isoparaffin reactant, after which, the concentrated isoparaffin reactant is returned to the recycle stream by means of line 294.

The liquid alkylate product mixture is withdrawn from the deisoparaffinization tower 244 by line 296, passed to a neutralization zone 298 wherein sulfate esters and other impurities are removed in accordance with teachings described above. The product mixture is then passed to deparaffinization zone 300 from line 302 wherein the alkylate is separated from normal paraffin at a temperature of between about 200° F. and about 360° F. under from about 40 p.s.i.g. to about 100 p.s.i.g. The normal paraffin is removed from zone 300 as an overhead vapor stream, a portion of which serves as reflux to the tower, and the liquid alkylate product is withdrawn therefrom by line 304 and passed to rerun tower 306 operating at a bottoms temperature of between about 250° F. and about 450° F. under tower top pressure from 0 p.s.i.g. to 20 p.s.i.g. A light alkylate fraction is removed from tower 306 as an overhead vapor, condensed in reflux line 308 by means of condenser 310 and a portion of the resulting liquid removed as a product of the process; the remaining portion serving as reflux to the tower. A heavy liquid alkylate fraction is removed from the bottom of tower 306 in line 312 as the heavy alkylate product of this process.

In a second modification of the process of this invention the process steps, including the alkylation reaction, deisoparaffinization, compression and indirect heat exchange in heat exchanger 264 are exactly the same as those previously described in FIGURE 4. This process departs from the previous process in that valves 256, 257 and 255 are closed while valves 258, 259, 260 and 261 are opened and the vapor from flashing zone 274 in place of being passed in indirect heat exchange with the liquid portion from 274, is passed in indirect heat exchange in flashing zone 278 with trap-out liquid in lines 314 and 315 from tower 244 to supply heat thereto and to maintain the distillation temperature in tower 244. The vapor from flashing zone 274 is passed through valved line 316 into heat exchanger 278 where part or all of it condenses. The vapor portion flows through lines 286 and 280 for compression in compressor 252, while a portion of the liquid is recycled to contactor 220 through line 283 and the remaining portion is passed to holding drum 284 by means of valved line 289. The liquid portion from the first flashing zone 274 passes through valved lines 276 and 318 and into line 288 for recycle to the reaction section of contactor 220. The remaining steps of the process, namely the treatment of the deisoparaffinized alkylate, including neutralization, deparaffinization, and distillation to separate light and heavy alkylate fractions, are substantially the same as those described above for FIGURE 4.

The following examples are offered as a better understanding of the present invention and are not to be construed as unnecessarily limiting to the scope thereof. The examples are carried out according to the teachings of the specification and the drawings described above.

Example 1

Into a cascade alkylation reactor is fed a continuous stream of isobutane containing about 15 percent normal butane and sulfuric acid of about 98 percent concentration in a mol ratio of about 7:1. The isobutane and sulfuric acid catalyst are emulsified and passed to a confined reaction zone wherein the emulsion is contacted with butylene in a mol ratio of about 20:1 isobutane:butylene. The reaction between the isobutane and butylene to form octanes takes place at 40° F. under about 11 p.s.i.g. in a plurality of confined reaction zones through which the emulsion is passed serially while contacting butylene introduced separately into each zone. The resulting reaction product mixture is then passed to a separating zone wherein vapors formed during the reaction, comprising isobutane, and lower boiling hydrocarbons such as propane are separated from a liquid phase containing isobutane, n-butane, alkylate product, sulfuric acid and small amounts of butyl sulfates. The liquid phase passed through a wire mesh screen and is allowed to settle for about 10 minutes after which the acid which separates from the hydrocarbon liquids is withdrawn and recycled to the reaction zone.

The hydrocarbon liquids or alkylate product mixture is withdrawn from the reactor at a temperature of about 45° F. under about 8 p.s.i.g. and is passed through a coalescer to further separate entrained acid and sulfur-bearing impurities therefrom. The liquid product mixture is then transferred to a deisobutanization tower wherein the liquid is stripped of isobutane and lower boiling hydrocarbons such as propane. The vaporous material is withdrawn from the reactor at a temperature of about 45° F. under about 8 p.s.i.g. and passed to a coalescer wherein entrained liquid is separated therefrom. The vapors are then transferred to a compressor from which two compressed vaporous streams are withdrawn; one at 47 p.s.i.g. and the other at 80 p.s.i.g. The compressed vaporous stream under 47 p.s.i.g. is passed in indirect heat exchange with the liquid material in the deisobutanization tower to supply heat thereto and to maintain the distillation temperature within the stripping tower. For example, the compressed gas at a condensation temperature of 65° F. is passed in indirect heat exchange with liquid material leaving the deisobutanization tower in a reboiler line at about 53° F. and returning liquid material to the deisobutanization tower at 58° F. The top of the deisobutanization tower is maintained at a pressure of about 16 p.s.i.g. and about 26° F. while the bottom of the tower is maintained under about 21 p.s.i.g. and about 84° F. Vaporous isobutane and lower boiling components are removed from the top of the deisobutanization tower at about 26° F. and passed to the compressor. The heat exchange media which has been condensed by heat exchange with the liquid product mixture in the deisobutanization zone is then passed to a pressure reduction valve wherein the pressure is reduced from 47 p.s.i.g. to about 26 p.s.i.g. and the resulting liquid is then recycled to the alkylation reaction zone for further contact with butylene. Part of the vaporous stream which has been compressed to 80 p.s.i.g. at a temperature of 120° F. is passed to a condenser wherein the temperature is lowered to 100° F. for the total liquification of the vapors while another portion is passed in indirect heat exchange with a trap-out liquid entering bottom reboiler at 65° F. and returning to the tower as a lquid vapor mixture at 89° F. The resulting liquid streams from the bottom reboiler and condenser are then mixed with the heat exchange media prior to heat exchange in the upper reboiler.

The deisoparaffinized liquid product mixture is removed from the bottom of the deisobutanization tower at a temperature of about 84° F. and is washed with water at a temperature of about 140° F. for removal of traces of sulfur-bearing contaminants. The wash water is discarded as the liquid product mixture passes through a coalescer and the hydrocarbon is then transferred to a debutanization zone wherein, at a bottom temperature of about 330° F., under 80 p.s.i.g., normal butane is separated from the alkylate product. This alkylate product is then further fractionated in a rerun tower to obtain a fraction of aviation gasoline and a higher boiling fraction comprising heavy alkylate.

The invention as described herein relates to an improved method for reboiling a distillation tower. This method comprises reacting hydrocarbons under such conditions that a vaporous effluent and a liquid product effluent are produced, passing the liquid effluent to a distillation zone to remove one of the liquid components boiling below said product, compressing the vaporous effluent to one or more pressure levels and passing the compressed vapors in indirect heat exchange with said zone, the vapors being compressed to a pressure at which the temperature of the vaporous effluent is above the boiling point of the boiling point of the component to be removed, below the boiling point of the reaction product and that at which at least part of the vapors are condensed during the heat exchange operation.

When the vaporous effluent contains a reactant of the reaction, the reactant is generally recovered, condensed and recycled to the reaction zone. When the lower boiling component removed from the distillation zone as a vapor also contains reactant, this vapor can be combined with the vaporous effluent and the combined vapors compressed and passed in indirect heat exchange with the distillation tower to reboil said tower. Although the above described improvement relates particularly to alkylation reactions, it is to be understood that other types of reactions, wherein a vaporous effluent is produced and a liquid product effluent is produced for subsequent distillation, are also within the scope of this invention.

The method for reboiling the deisoparaffinization tower can be any of the procedures herein described, and numerous modifications and alterations of these procedures will become apparent to those skilled in the art without departing from the scope of this invention.

Having thus described my invention I claim:

1. In an alkylation process which comprises contacting isobutane with an olefin in the presence of sulfuric acid in an alkylation contactor to produce a vaporous hydrocarbon effluent containing isobutane and a liquid effluent containing sulfuric acid, alkylate and unreacted isobutane; separating the vaporous effluent from the liquid effluent; separately removing sulfuric acid from the liquid effluent; and subjecting the resulting liquid alkylate mixture to deisobutanization; the improvement which comprises: passing the liquid alkylate mixture to a deisobutanization zone; removing isobutane as a vaporous fraction from said zone; compressing the vaporous fraction and the vaporous effluent to the pressure levels within the range of between about 20 p.s.i.g. and about 125 p.s.i.g. at a condensation temperature of between about 40° F. and about 140° F.; maintaining as two distinct and separate streams the vapors compressed to different pressure levels supplying heat necessary to effect the aforementioned deisobutanization of said liquid alkylate mixture in said zone by passing the vapor compressed to the lower pressure in indirect heat exchange with the deisobutanization zone in a first heat exchanger to reboil said zone, and passing the vapor compressed to the higher pressure in indirect heat exchange with the deisobutanization zone at a point below said first heat exchanger to reboil said zone in a second heat exchanger; condensing the low pressure vapor in said first heat exchange operation; recycling the resulting liquid to the alkylation contactor as part of the isobutane feed thereto; condensing the higher pressure vapor and flashing the resulting condensate in a third heat exchanger to produce a vaporous phase and a liquid phase; recycling the vaporous phase to said compression step; recycling the liquid phase to the alkylation contactor as part of the isobutane feed thereto and recovering a deisobutanized alkylate mixture from the deisobutanization zone.

2. The process of claim 1 wherein olefin is cooled in said third heat exchanger before entering the alkylation contactor.

3. The process of claim 1 wherein the liquid in the deisobutanization zone is further reboiled by indirect heat exchange of the liquid alkylate mixture with the material in the third heat exchanger.

4. In an alkylation process which comprises contacting an olefin with an isoparaffin in the presence of sulfuric acid as a catalyst in an alkylation contactor to produce a vaporous hydrocarbon effluent containing unreacted isoparaffin and a liquid effluent containing catalyst, alkylate, normal paraffin and unreacted isoparaffin; separating the vaporous effluent from the liquid effluent; separately removing the catalyst from the liquid effluent; and subjecting the remaining liquid alkylate mixture to deparaffinization; the improvement which comprises: passing the liquid alkylate mixture to a deparaffinization zone and withdrawing unreacted isoparaffin as a vaporous overhead fraction, normal paraffin as a vaporous middle fraction and liquid alyklate as a liquid bottom fraction from said deparaffinization zone; recovering alkylate from the bottom fraction as a product of the process; compressing a mixture of the vaporous overhead fraction and the vaporous effluent to a plurality of different pressure levels; maintaining as distinct and separate streams each of the vapors compressed to a different pressure; reboiling the upper portion of said zone from which the vaporous overhead fraction is removed by passing the vapor compressed to the lowest pressure level in indirect heat exchange with the liquid in said upper portion of said deparaffinization zone; passing vapor compressed to an intermediate pressure level in indirect heat exchange with the liquid in the middle portion of said zone from which normal paraffin is removed to reboil said middle portion of said deparaffination zone; passing the vapor compressed to the highest pressure level in indirect heat exchange with the bottom portion of said zone from which liquid alkylate product is removed to supply at least a portion of the heat necessary to reboil said bottom portion of the deparaffination zone; and condensing compressed vapors in each of the heat exchange operations.

5. In alkylation process which comprises contacting an olefin with an isoparaffin in the presence of sulfuric acid as a catalyst in an alkylation contactor to produce a vaporous hydrocarbon effluent containing unreacted isoparaffin and a liquid effluent containing catalyst, alkylate, normal paraffin and unreacted isoparaffin; separating the vaporous effluent from the liquid effluent; separately removing the catalyst from the liquid effluent; and subjecting the remaining liquid alkylate mixture to deisoparaffinization; the improvement which comprises: passing the liquid alkylate mixture to a deparaffinization zone which is operated as a stripper, substantially without reflux; withdrawing unreacted isoparaffin as a vaporous overhead fraction from said zone; withdrawing normal paraffin as a vaporous side fraction from said zone; condensing said normal paraffin and recovering the condensate as a product of the process; continuously withdrawing a liquid alkylate stream from the lower portion of said zone; treating the liquid alkylate stream for the neutralization and removal of contaminants; continuously recycling the decontaminated liquid alkylate stream to the lower portion of said stripping zone; removing deparaffinized liquid alkylate from the bottom of said zone as a product of the process; compressing the vaporous overhead fraction and the vaporous effluent to a plurality of pressure levels varying between about 20 p.s.i.g. and about 125 p.s.i.g. and passing the gaseous stream of each pressure level as an indirect heat exchange medium to a separate heat exchange with liquid from the deisobutanization zone to reboil said zone at each site of heat exchange and to condense the compressed vapor in the heat exchange operation; passing the condensed vapor to a flashing zone; passing the liquid portion from said flashing zone to a separate heat exchanger; withdrawing and recycling the liquid from said separate heat exchanger to the alkylation contactor as part of the isoparaffin feed thereto; returning the vaporous portion from said separate heat exchanger and a portion of the vapors from said flashing zone to said compressor; condensing the remaining portion of vapors from said first flashing zone by indirect heat exchange with the liquid from said flashing zone in said separate heat exchanger and passing said condensed vapors to a distillation zone for removal of low boiling materials.

References Cited by the Examiner

UNITED STATES PATENTS

| | | | |
|---|---|---|---|
| 2,666,019 | 1/54 | Winn et al. | 208—353 |
| 2,723,940 | 11/55 | Fenske et al. | 208—365 |
| 2,818,459 | 12/57 | Gantt | 260—683.58 |
| 2,829,181 | 4/58 | Stiles et al. | 260—683.58 |

ALPHONSO D. SULLIVAN, *Primary Examiner.*

ALLAN M. BOETTCHER, *Examiner.*